(12) United States Patent
Azar et al.

(10) Patent No.: US 12,381,461 B2
(45) Date of Patent: Aug. 5, 2025

(54) AIRGAP CONTROL IN AN ELECTRIC GENERATOR FOR A WIND TURBINE

(71) Applicant: Siemens Gamesa Renewable Energy A/S, Brande (DK)

(72) Inventors: Ziad Azar, Sheffield (GB); Alexander Duke, Sheffield (GB)

(73) Assignee: Siemens Gamesa Renewable Energy A/S, Brande (DK)

( * ) Notice: Subject to any disclaimer, the term of this patent is extended or adjusted under 35 U.S.C. 154(b) by 26 days.

(21) Appl. No.: 18/218,345

(22) Filed: Jul. 5, 2023

(65) Prior Publication Data
US 2024/0022150 A1  Jan. 18, 2024

(30) Foreign Application Priority Data

Jul. 15, 2022  (EP) ..................................... 22185091

(51) Int. Cl.
*H02K 21/02* (2006.01)
*F03D 9/25* (2016.01)
(Continued)

(52) U.S. Cl.
CPC ............. *H02K 21/025* (2013.01); *F03D 9/25* (2016.05); *H02K 7/1838* (2013.01);
(Continued)

(58) Field of Classification Search
CPC ............... H02K 21/025; H02K 7/1838; H02K 2201/03; H02K 15/02; F03D 9/25; F05B 2220/706; H02P 2101/15; Y02E 10/72
See application file for complete search history.

(56) References Cited

U.S. PATENT DOCUMENTS 7,581,921 B2 * 9/2009 Bagepalli ................ F03D 80/00
  415/14
9,143,071 B2 * 9/2015 Diedrichs ............... H02P 29/50
(Continued)

FOREIGN PATENT DOCUMENTS

CN  117411362 A  *  1/2024  ............... F03D 9/25
EP  3086467 A1  10/2016
(Continued)

OTHER PUBLICATIONS

European Search Report issued on Jan. 9, 2023 for application No. 22185091.0.

*Primary Examiner* — Pedro J Cuevas
(74) *Attorney, Agent, or Firm* — Schmeiser, Olsen & Watts, LLP

(57) ABSTRACT

An electric generator for a wind turbine is provided including a stator or rotor, the stator or rotor having plurality of winding systems, each winding system covering a respective angular portion of the stator or rotor about an axis of rotation of the electric generator, and a controller for controlling the current flowing in the winding systems. The controller is configured for receiving or determining a thickness of an airgap between the stator and the rotor and controlling the current flowing in at least one of the winding systems so that a respective magnetic radial force is generated, the magnetic radial force acting on the stator and/or rotor for increasing the airgap where the airgap is below a threshold airgap value.

11 Claims, 3 Drawing Sheets

(51) Int. Cl.
*H02K 7/18* (2006.01)
*H02P 101/15* (2016.01)

(52) U.S. Cl.
CPC .... *F05B 2220/706* (2013.01); *H02K 2201/03* (2013.01); *H02P 2101/15* (2015.01); *Y02E 10/72* (2013.01)

(56) References Cited

U.S. PATENT DOCUMENTS

| | | | |
|---|---|---|---|
| 10,724,502 B2 * | 7/2020 | Moore | F03D 7/06 |
| 11,149,715 B2 * | 10/2021 | Moore | F03D 3/005 |
| 2007/0292260 A1 * | 12/2007 | Bagepalli | F03D 17/00 |
| | | | 415/14 |
| 2008/0164697 A1 * | 7/2008 | Schram | H02K 49/06 |
| | | | 310/90 |
| 2014/0184174 A1 * | 7/2014 | Diedrichs | H02P 9/14 |
| | | | 322/61 |
| 2014/0356162 A1 * | 12/2014 | Fasolo | H02P 23/04 |
| | | | 416/1 |
| 2019/0360465 A1 * | 11/2019 | Moore | F03D 3/005 |
| 2020/0355159 A1 * | 11/2020 | Moore | F03D 3/005 |
| 2024/0022150 A1 * | 1/2024 | Azar | H02K 7/1838 |

FOREIGN PATENT DOCUMENTS

| | | | | |
|---|---|---|---|---|
| EP | 4307540 A1 * | 1/2024 | | F03D 9/25 |
| WO | WO-2013093894 A1 * | 6/2013 | | F03D 17/00 |

* cited by examiner

AIRGAP CONTROL IN AN ELECTRIC GENERATOR FOR A WIND TURBINE

CROSS-REFERENCE TO RELATED APPLICATIONS

This application claims priority to EP Application No. 22185091.0, having a filing date of Jul. 15, 2022, the entire contents of which are hereby incorporated by reference.

FIELD OF TECHNOLOGY

The following relates to a controller and a method for controlling the airgap between stator and rotor in an electric generator for a wind turbine. The following particularly relates to large permanent magnet electric generators including a plurality of winding systems.

BACKGROUND

Electric generators for wind turbines, in particular direct drive generators of great dimensions, have airgap deformation due to magnetic pull, static and/or dynamic rotor eccentricity, manufacturing and assembly tolerances, unbalanced loads, nonuniform thermal deformation as well as tilt and yaw loads. Such airgap deformation is non-uniform when measured along a circumferential direction, i.e., a circular direction around the axis of rotation of the electric generator as well as along the axial length of the electric generator. To ensure that no collision occurs between stator and rotor, the airgap is designed to account for the changes and deformations occurring during operation, this leading to a larger designed airgap and thus lower torque. Collision between stator and rotor may also be avoided by implementing security systems which stops the electric generator if the airgap reaches a minimum threshold value, but this obviously is not desirable, as it determines a reduction of the energy production. The airgap has to be designed with account for all extreme conditions and tolerances, and not only for the desired performance of the electric generators.

It is therefore desirable to more effectively control the airgap in an electric generator for a wind turbine, to provide higher performances in an electric generator by reducing as much as possible the airgap between stator and rotor, at the same time preventing any collision between stator and rotor.

SUMMARY

An aspect relates to a wind turbine is provided, an electric generator for a wind turbine is provided, which comprises a stator or rotor having a plurality of winding systems, each winding system covering a respective angular portion of the stator or rotor about an axis of rotation of the electric generator, and a controller for controlling the current flowing in the winding systems, the controller being connected to the plurality of sensors for receiving the plurality of measurements of the airgap. The controller is configured for receiving or determining a thickness of an airgap between the stator and the rotor and controlling the current flowing in at least one of the winding systems so that a respective magnetic radial force is generated, the magnetic radial force acting on the stator and/or rotor for increasing the airgap where the airgap is below a threshold airgap value.

The electric generator may be a permanent magnet electric generator. Particularly, the electric generator may be used in a wind turbine.

According to a further aspect of embodiments of the present invention a method of operating an electric generator is provided, the electric generator comprising a stator or rotor having a plurality of winding systems, each winding system covering a respective angular portion of the stator or rotor about an axis of rotation of the electric generator. In embodiments, the method includes the steps of:

measuring or estimating a thickness of an airgap between the stator and the rotor, controlling the current flowing in the winding systems, controlling the current flowing in at least one of the winding systems so that a respective magnetic radial force is generated, the magnetic radial force acting on the stator and/or rotor for increasing the airgap where the airgap is below a threshold airgap value.

According to embodiments of the present invention, a plurality of sensors is positioned in a plurality of respective positions distributed about the axis of rotation for providing a plurality of respective thickness measurements of the airgap, the controller being connected to the plurality of sensors for receiving the plurality of measurements of the airgap.

According to other embodiments of the present invention, the controller is configured for determining the thickness of the airgap through an estimation procedure. For example, flux or voltage estimations may be used as inputs in the controller to estimate the thickness of the airgap.

With "winding system" it is meant a system of wound conductors within the generator covering one portion or a plurality of portions of the complete circumference of the generator about its rotational axis. In embodiments of the present invention, the electric generator may include n winding systems, n being an integer greater than one, each covering an angle of 360°/n degrees around a rotational axis of the electric generator. According to one embodiment, two winding systems may be present, each winding system covering an angle of 180 degrees. According to another embodiment, four winding systems may be present, each winding system covering an angle of 90 degrees. In embodiments of the present invention, the electric generator may include n winding systems, n being an integer greater than one, each covering a plurality of angular portions around a rotational axis of the electric generator. The angular portions of one winding system may be alternated between the angular portions of the other winding system(s). For example, according to one embodiment, two winding systems may be present, each winding system covering two angular portions of 90 degrees each, angularly alternated between two 90-degrees angular portions of the other winding system. The winding system may be a concentrated or distributed winding system.

In large systems where a plurality of winding systems is present, the current in each of the winding systems may be controlled for locally causing deformation of the airgap in order to compensate defects, like static and/or dynamic rotor eccentricity, manufacturing and assembly tolerances, unbalanced loads, nonuniform thermal deformation as well as tilt and yaw loads. The system prevents the airgap to reach an undesired minimum threshold airgap value. This may prevent the intervention of a security system for preventing collision between the stator and rotor by stopping the electric generator, therefore preventing the corresponding loss of torque production. This will enable to design a smaller airgap and thus produce a higher torque density and more AEP (Annual Energy Production). The minimum threshold airgap value may be predefined and provided to the controller, determined by the controller, for example based on operating conditions and/or the plurality of measurements provided by the plurality of sensors.

According to embodiments of the present invention, the controller is configured for controlling the current flowing in each of the winding systems so that a plurality of magnetic radial forces respectively acting on the winding systems are generated, each magnetic radial force acting on the stator and/or rotor for reducing the airgap where the airgap is above the threshold airgap value and increasing the airgap where the airgap is below the threshold airgap value. This may provide a more uniform airgap along the circumferential direction.

According to embodiments of the present invention, the plurality of winding systems is provided in the stator or rotor, the rotor comprising a plurality of permanent magnets, a magnet pull being active between the stator and rotor as a result of the magnetic interaction between the winding systems and the permanent magnets. The controller is configured for controlling the current flowing in at least one of the winding systems so that the magnetic radial force decreases the magnet pull where the airgap is below the threshold airgap value.

According to other embodiments of the present invention, the controller may be configured for controlling the current flowing in the winding systems so that a plurality of magnetic radial forces respectively acting on the winding systems are generated, each magnetic radial force acting on the stator and/or rotor decreasing the magnet pull where the airgap is below the threshold airgap value and increasing the magnet pull where the airgap is above the threshold airgap value. The resultant of the magnetic pull and magnetic radial force permits to control locally the thickness of the airgap, i.e., the local distance between stator and rotor.

According to embodiments of the present invention, the current in each winding system may be differently controlled in amplitude and/or phase, with respect to the other winding system(s). This enhances the balance of airgap, so minimising the parasitic effects, noise and vibration, as well as component lifetime.

BRIEF DESCRIPTION

Some of the embodiments will be described in detail, with reference to the following figures, wherein like designations denote like members, wherein.

DETAILED DESCRIPTION

Figure 1:
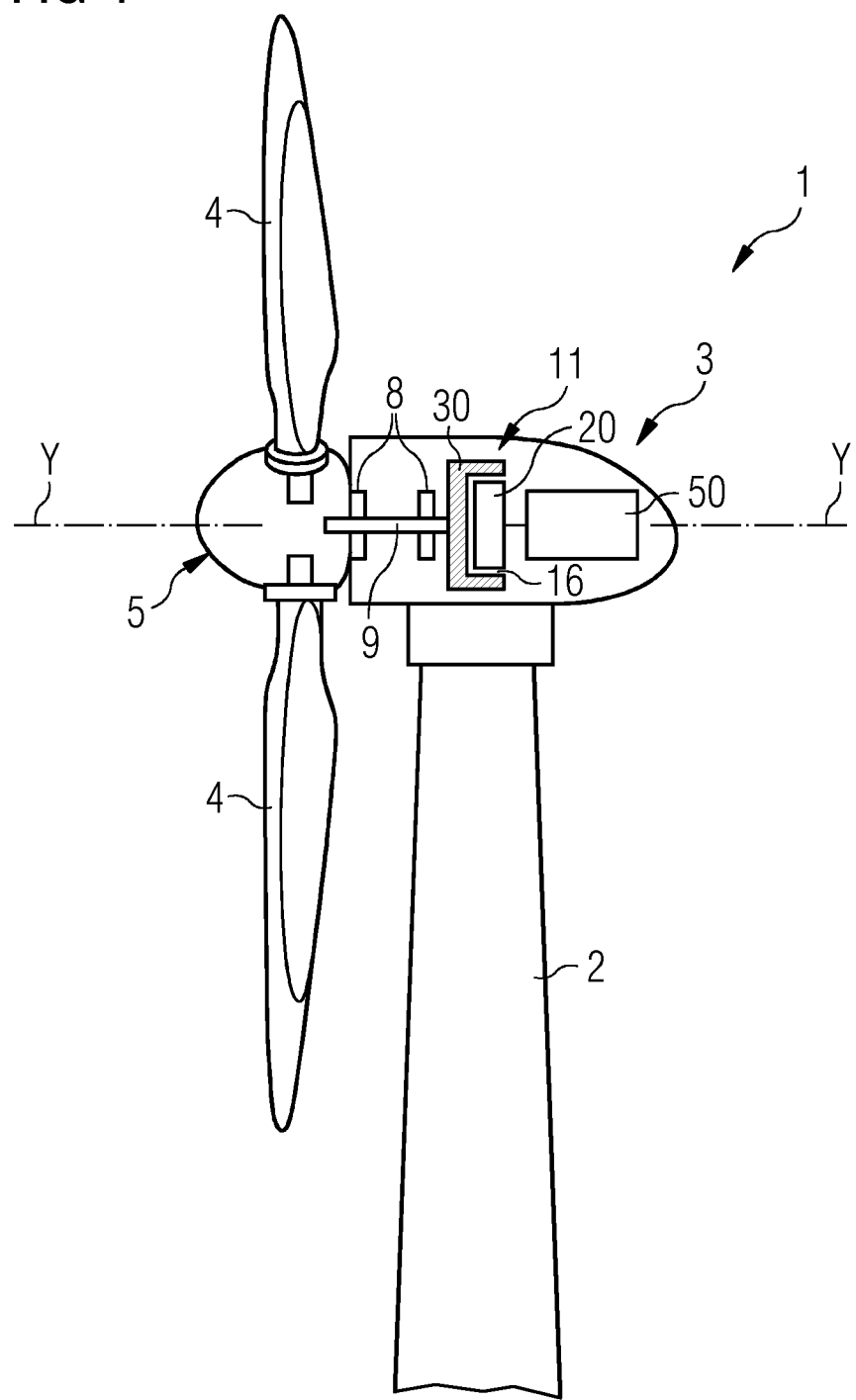
FIG. 1 shows a schematic section of a wind turbine including an electric generator according to the present invention.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises a wind rotor 5 having two, three or more blades 4 (in the perspective of FIG. 1 only two blades 4 are visible). The wind rotor 5 is rotatable around a rotational axis Y. In general, when not differently specified, the terms axial, radial and circumferential in the following are made with reference to the rotational axis Y. The blades 4 extend radially with respect to the rotational axis Y.

The wind turbine 1 comprises an electric generator 11 having a controller 50. The wind rotor 5 is rotationally coupled with the electric generator 11 by a rotatable shaft. According to other possible embodiments of the present invention, the wind rotor 5 is rotationally coupled directly with the electric generator 11 (direct-drive generator configuration).

The electric generator 11 includes a stator 20 and a rotor 30. The rotor 30 is radially external to the stator 20 and is rotatable with respect to the stator 20 about the rotational axis Y. According to other embodiments of the present invention (not shown) the rotor is radially internal to the stator 20. According to other embodiments of the present invention (not shown) the rotor is axially stacked next to the stator 20 as would be the case in axial flux machines. According to other possible embodiments of the present invention (not represented in the attached figures), the embodiments of the present invention can be applied to an electric generator, which is not comprised in a wind turbine. According to embodiments of the present invention, the electric generator 11 is a permanent magnet electric generator 11, where a plurality of winding systems 41, 42, 43, 44 are provided in the stator 20, the rotor 30 comprising a plurality of permanent magnets 70, as further specified in the following. An airgap 10 is provided between the rotor 30 and the stator 20 for allowing the necessary clearance which permits the rotation of the rotor 30 about the stator 20 without colliding therewith. The thickness of the airgap along a circumferential coordinate parallel to the direction of rotation of the rotor 30 is not constant, due to magnetic pull between the stator 20 and the permanent magnets 70, static and/or dynamic rotor eccentricity, manufacturing and assembly tolerances, unbalanced loads, nonuniform thermal deformation as well as wind turbine tilt and yaw loads.

Figure 2:
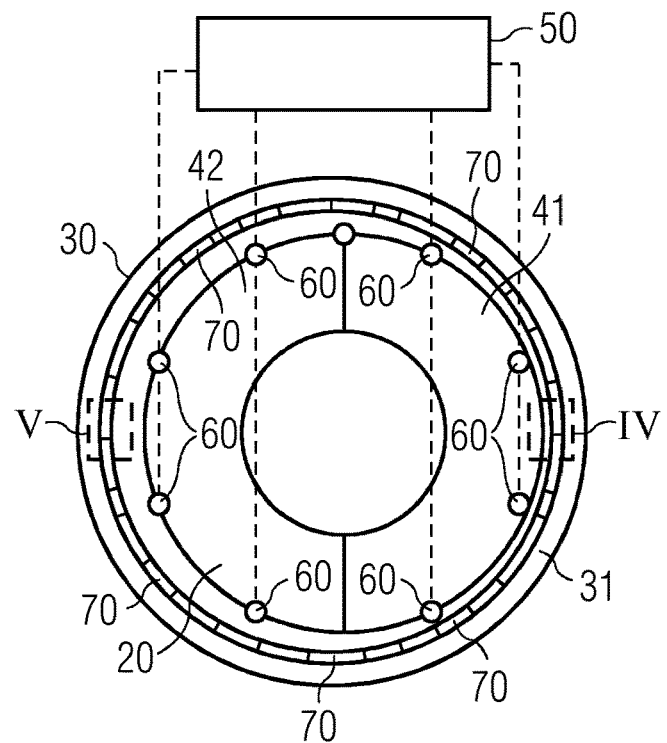
FIG. 2 shows a schematic section, orthogonal the axis of rotation, of an electric generator according to a first embodiment of the present invention.
Figure 4:
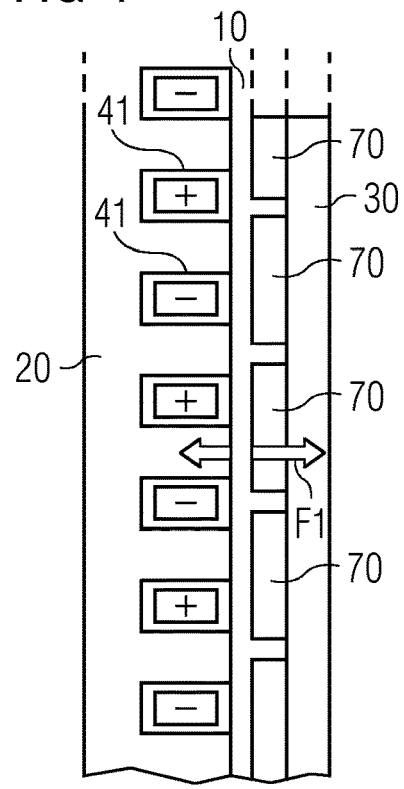
FIG. 4 shows a magnified view of the detail IV of FIG. 2.
Figure 5:
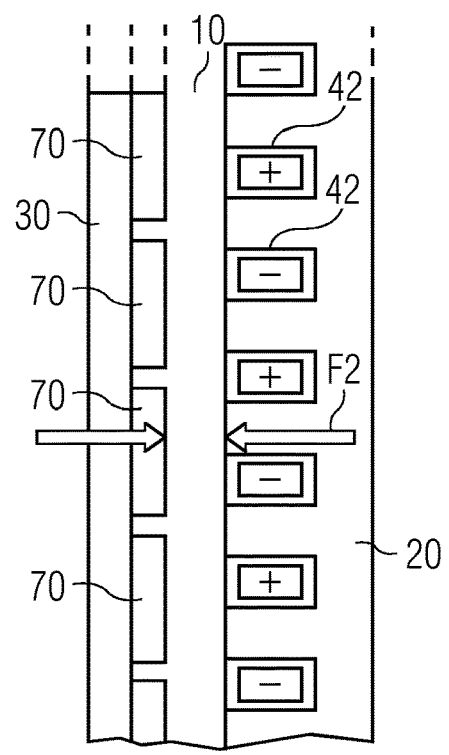
FIG. 5 shows a magnified view of the detail V of FIG. 2.

FIGS. 2, 4 and 5 illustrate schematically a first embodiment of the electric generator 11. The stator 20 comprises a cylindrical stator body 21 having a plurality of radially protruding teeth interposed between a plurality of slots, so that each slot circumferentially extends between two adjacent teeth (teeth and slots are conventional and not shown in the schematic representation if FIG. 2). The slots accommodate two winding systems 41, 42, each winding system 41, 42 covering an angle of 180 degrees about the rotational axis Y. Each winding system may be powered independently from the other winding system. The rotor 30 includes a cylindrical hollow rotor body 31 on which the plurality of permanent magnets 70 are fixed. The magnets radially protrude towards the stator 20, the airgap 10 being radially interposed between the stator and the permanent magnets 70. According to embodiments of the present invention, the stator comprises a plurality of sensors 60 positioned in a plurality of respective positions distributed about the axis of rotation Y for providing a plurality of respective measurements of the airgap According to other embodiments of the invention, the plurality of sensors 60 are provided on the rotor 30. According to other embodiments of the invention, the plurality of sensors 60 are provided on the stator 20 and rotor 30. According to other embodiments of the invention, the sensors are not present, and the airgap 10 is estimated by the controller 50 using estimation procedures. Flux or voltage estimations may be used as inputs in the controller 50 to estimate the thickness of the airgap 10. The electric generator 11 further includes a controller 50 connected to the plurality of sensors 60 for receiving the plurality of measurements of the airgap 10. The controller 50 controls the current flowing in the winding systems 41, 42 the controller 50. The current flowing in each winding systems 41, 42 generate a respective magnetic radial force, which is used in operation for controlling the thickness of the airgap 10. The magnetic radial force generated in each winding systems 41, 42 is used to contrast the effects of the magnetic pull between the stator 20 and the permanent magnets 70, static and/or dynamic rotor eccentricity, manufacturing and assembly tolerances, unbalanced loads, nonuniform thermal deformation as well as wind turbine tilt and yaw loads. The controller 50 is configured for controlling the current flowing in at least one of the winding systems 41, 42 so the magnetic radial force acts on the stator 20 and/or rotor 30 for increasing the airgap 10 where the airgap is below a threshold airgap value, thus avoiding collision between stator 20 and rotor 30. The magnetic radial force may provide such effect by deforming the stator body 21 and/or the winding systems 41, 42, and/or the rotor body. The controller 50 may be further configured for controlling the current flowing in at least one of the winding systems 41, 42 so the magnetic radial force acts on the stator 20 and/or rotor 30 for decreasing the airgap 10 where the airgap is above a threshold airgap value. Increasing the airgap 10 where the airgap is below a threshold airgap value and at the same time decreasing the airgap 10 where the airgap is above a threshold airgap value may have the effect of making the airgap as uniform in thickness as possible along the circumferential direction.

FIG. 2 schematically shows an operative condition, where the thickness of the airgap 10 is variable along a circumferential direction. A minimum of the thickness of the airgap 10 is reached at the right side of the airgap 10 of FIG. 2 (detail IV, magnified in FIG. 4), at the first winding system 41. A minimum of the thickness of the airgap 10 is reached at the right side of the airgap 10 of FIG. 2 (detail V, magnified in FIG. 5), at the second winding system 42. With reference to FIG. 4, if the airgap 10 is below a threshold airgap value, the controller 50 controls the current flowing in the first winding systems 41, so that a respective first magnetic radial force F1 is generated. The first magnetic radial force F1 acts on the stator 20 and/or rotor for increasing the airgap 10. The first magnetic radial force F1 decreases the magnet pull between stator 20 and rotor 30 where the airgap 10 is below the threshold airgap value. With reference to FIG. 5, if the airgap 10 is above a threshold airgap value, the controller 50 controls the current flowing in the second winding systems 42, so that a respective second magnetic radial force F2 is generated. The second magnetic radial force F2 acts on the stator 20 and/or rotor 30 for decreasing the airgap 10. The second magnetic radial force F2 increases the magnet pull between the stator 20 and rotor 30 where the airgap 10 is above the threshold airgap value. The controller 50 is configured for controlling the current flowing in the winding systems 41, 42 by controlling the amplitude and/or phase angle of the current. The reference threshold airgap value may be predefined, i.e., previously determined and saved in a memory associated with the controller or may be determined in operation by the controller. According to embodiments of the invention, the threshold airgap value is determined by the controller 50 based on operating conditions. For example, the threshold airgap value is determined by the controller 50 based on the plurality of measurements provided by the plurality of sensors 60. According to an embodiment of the invention, the threshold airgap value is calculated by the controller 50 as mean value of the plurality of measurements provided by the plurality of sensors 60. According to an embodiment of the invention, the threshold airgap value is calculated by the controller 50 by an estimation method, for example involving flux or voltage estimations.

Figure 3:
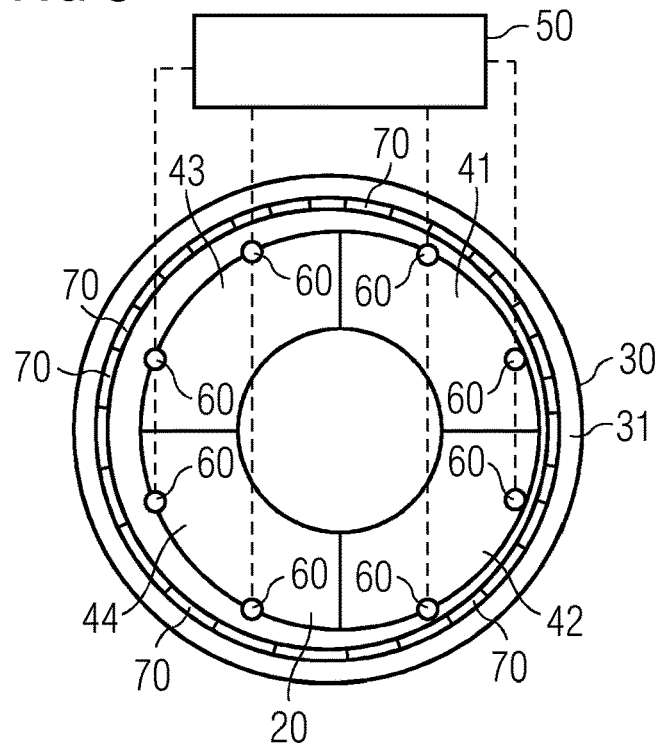
FIG. 3 shows a schematic section, orthogonal the axis of rotation, of an electric generator according to a second embodiment of the present invention.

FIG. 3 illustrates schematically a second embodiment of the electric generator 11. In the second embodiment, the electric generator 11 differentiates itself form the one in the first embodiment for comprising four winding systems 41, 42, 43, 44. According to other embodiments of the invention, the electric generator 11 comprises n winding systems, where n is an integer greater than one, each covering an angle of 360°/n degrees around a rotational axis of the electric generator 11. In such embodiment, the controller 50 is configured to operate the n winding systems in a similar way as that described with reference to the first embodiment of FIG. 2.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electric generator for a wind turbine comprising:
a stator and a rotor, the rotor having a plurality of permanent magnets and the stator having a plurality of winding systems, each winding system covering a respective angular portion of the stator about an axis of rotation of the electric generator, a magnet pull being active between the stator and rotor as a result of magnetic interaction between the winding systems and the permanent magnets, and
a controller for controlling the current flowing in the winding systems, wherein the controller is configured for receiving or determining a thickness of an airgap between the stator and the rotor and controlling the current flowing in at least one of the winding systems so that a respective magnetic radial force is generated, the magnetic radial force acting on the stator and/or rotor for decreasing the magnet pull where the airgap is below a threshold airgap value and/or increasing the magnet pull where the airgap is above the threshold airgap value,
wherein the threshold airgap value is determined by the controller based on operating conditions and/or a plurality of respective thickness measurements of the airgap provided by a plurality of sensors.

2. The electric generator according to claim 1, wherein the plurality of sensors is positioned in a plurality of respective positions distributed about the axis of rotation for providing the plurality of respective thickness measurements of the airgap between the stator and the rotor, the controller being connected to the plurality of sensors for receiving the plurality of measurements of the airgap.

3. The electric generator according to claim 1, wherein the controller is configured for determining the thickness of the airgap through an estimation procedure.

4. The electric generator according to claim 1, wherein the controller is configured for controlling the current flowing in each of the winding systems so that a plurality of magnetic radial forces respectively acting on the winding systems are generated, each magnetic radial force acting on the stator and/or rotor for reducing the airgap where the airgap is above the threshold airgap value and increasing the airgap where the airgap is below the threshold airgap value.

5. The electric generator according to claim 1, wherein the controller is configured for controlling the current flowing in the winding systems so that a plurality of magnetic radial forces respectively acting on the winding systems are generated, each magnetic radial force acting on the stator and/or rotor decreasing the magnet pull where the airgap is below the threshold airgap value and/or increasing the magnet pull where the airgap is above the threshold airgap value.

6. The electric generator according to claim 1, wherein the electric generator comprises n winding systems, n being an integer greater than one, each covering an angle of 360°/n degrees around a rotational axis of the electric generator.

7. The electric generator according to claim 1, wherein the threshold airgap value is predefined.

8. The electric generator according to claim 1, wherein the controller is configured for controlling the current flowing in at least one of the winding systems by controlling the amplitude and/or phase angle of the current.

9. A wind turbine including an electric generator according to claim 1.

10. A method for operating an electric generator for a wind turbine comprising a stator and a rotor, the rotor having a plurality of permanent magnets and the stator having a plurality of winding systems, each winding system covering a respective angular portion of the stator about an axis of rotation of the electric generator, a magnet pull being active between the stator and rotor as a result of magnetic interaction between the winding systems and the permanent magnets, the method including:
- measuring or estimating a thickness of an airgap between the stator and the rotor,
- controlling the current flowing in the winding systems, and
- controlling, by a controller, the current flowing in at least one of the winding systems so that a respective magnetic radial force is generated, the magnetic radial force acting on the stator and/or rotor for decreasing the magnet pull where the airgap is below a threshold airgap value and/or increasing the magnet pull where the airgap is above the threshold airgap value,
- wherein the threshold airgap value is determined by the controller based on operating conditions and/or a plurality of respective thickness measurements of the airgap provided by a plurality of sensors.

11. The method according to claim 10, wherein the step of controlling includes controlling the current flowing in each of the winding systems so that a plurality of magnetic radial forces respectively acting on the winding systems are generated, each magnetic radial force acting on the stator and/or rotor for reducing the airgap where the airgap is above the threshold airgap value and/or increasing the airgap where the airgap is below the threshold airgap value.

* * * * *